United States Patent
Laurent et al.

(10) Patent No.: US 11,777,735 B2
(45) Date of Patent: Oct. 3, 2023

(54) METHOD AND DEVICE FOR ANONYMOUS ACCESS CONTROL TO A COLLABORATIVE ANONYMIZATION PLATFORM

(71) Applicant: COMMISSARIAT A L'ENERGIE ATOMIQUE ET AUX ENERGIES ALTERNATIVES, Paris (FR)

(72) Inventors: Frédéric Laurent, Jouy en Josas (FR); Alexis Olivereau, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/780,495

(22) PCT Filed: Dec. 9, 2020

(86) PCT No.: PCT/EP2020/085186
§ 371 (c)(1),
(2) Date: May 26, 2022

(87) PCT Pub. No.: WO2021/122186
PCT Pub. Date: Jun. 24, 2021

(65) Prior Publication Data
US 2023/0040929 A1    Feb. 9, 2023

(30) Foreign Application Priority Data
Dec. 17, 2019 (FR) ..................... 1914647

(51) Int. Cl.
*H04L 9/32* (2006.01)
*H04L 9/08* (2006.01)
*H04L 9/40* (2022.01)

(52) U.S. Cl.
CPC ............ *H04L 9/3228* (2013.01); *H04L 9/088* (2013.01); *H04L 9/0827* (2013.01);
(Continued)

(58) Field of Classification Search
CPC ...................................... H04L 9/3228
See application file for complete search history.

(56) References Cited

U.S. PATENT DOCUMENTS

2010/0185861 A1* 7/2010 Chase ..................... H04L 9/083
713/171
2010/0285774 A1* 11/2010 Ginzboorg .............. H04L 9/088
455/411

(Continued)

FOREIGN PATENT DOCUMENTS

FR    3 072 238 A1    4/2019

OTHER PUBLICATIONS

Rivest, et al., "How to Leak a Secret", ASIACRYPT 2001, vol. 2248, pp. 552-565, 2001.
(Continued)

*Primary Examiner* — Ponnoreay Pich
(74) *Attorney, Agent, or Firm* — BakerHostetler

(57) ABSTRACT

A device and a method implemented by computer for authorizing, to a user having access rights granted by a first operator, a completely anonymous and secure access, with no trusted third-party, to a collaborative anonymization platform and/or to a service requiring privacy properties based on such a platform operated by various operators.

10 Claims, 3 Drawing Sheets

(52) U.S. Cl.
CPC ............ *H04L 9/3215* (2013.01); *H04L 63/10* (2013.01); *H04L 2209/42* (2013.01)

(56) References Cited

U.S. PATENT DOCUMENTS

| | | | | |
|---|---|---|---|---|
| 2012/0331283 | A1* | 12/2012 | Chandran | ............... H04L 9/088 |
| | | | | 713/150 |
| 2020/0382301 | A1* | 12/2020 | Saket | ................... H04L 9/3228 |
| 2023/0040929 | A1* | 2/2023 | Laurent | ................ H04L 9/3215 |

OTHER PUBLICATIONS

Benaloh, et al., "One-way accumulators: A decentralized alternative to digital signatures", Advances in Cryptology-Eurocrypt'93, LNCS, vol. 765, pp. 274-285, 1994.

Park, et al., "Wireless Authentication Protocol Preserving User Anonymity", Information Security Group, Information and Communications Univ., 2001.

Vollbrecht, et al., "AAA Authorization Framework", Network Working Group, Request for Comments: 2904, Aug. 2020.

* cited by examiner

METHOD AND DEVICE FOR ANONYMOUS ACCESS CONTROL TO A COLLABORATIVE ANONYMIZATION PLATFORM

CROSS-REFERENCE TO RELATED APPLICATIONS

This application is a National Stage of International patent application PCT/EP2020/085186, filed on Dec. 9, 2020, which claims priority to foreign French patent application No. FR 1914647, filed on Dec. 17, 2019, the disclosures of which are incorporated by reference in their entirety.

FIELD OF THE INVENTION

The invention is situated in the field of communications protocols, and relates more particularly to a method and a device for anonymous access control to a collaborative anonymization platform.

BACKGROUND

The security of data and the controlled access to various collaborative systems are major challenges to which organizations need to confront in order to limit the risks of intrusion and of attacks. The existing collaborative anonymization platforms offer little or no access control, and hence no security as such.

At the present time, the communications solutions offering the best levels of privacy are free and collaborative solutions based on pair-to-pair (P2P) protocols, such as the protocols Tor ("The Onion Router") or I2P ("Invisible Internet Project"). These solutions do not require any particular authentication and access mechanism, on the one hand because they are free, but also and above all, since an authentication and access mechanism is, in principle, incompatible with a high level of anonymization.

One improved solution described in the patent application FR3072238 from the applicant offers a collaborative anonymization platform having a level of privacy and of security potentially much higher than the existing solutions, but also performance characteristics in terms of quality of service compatible with modern Internet and professional uses, while at the same time allowing a certain control over the exchanges in order to limit criminal exploitation of the platform.

All of these solutions describe the nominal operation of the global system. However, so as not to diminish the advantage of the anonymization platform in nominal mode, it is also necessary to guarantee that privacy is not compromised during the transient phase. Typically, the access to a desired service should be allowed to take place without any compromise on the level of privacy and of security of the user.

Furthermore, beyond the access to the platform itself, services (restricted, or commercial) desiring to benefit from real anonymization properties (i.e. from the network layer up to the application layer) may be envisioned on top of the platform, such as for example an image processing service for healthcare based on an artificial intelligence motor hosted in a remote processing center, or secure communication services of the "Telegram Messenger" or "Signal" type, or again applications for exchanges of information on bank fraud.

There thus exists the need for a solution which allows the access to a collaborative anonymization platform to be controlled without compromising the privacy of the access requestor.

A requestor for access to a collaborative anonymization platform may rely on several providers of access to this platform which are, in the general case, several communications operators and at least one operator of the anonymization service. Amongst the communications operators, one of them is assumed to have acquired the access rights to the collaborative anonymization platform, for example via the subscription to an option in a contract for subscription to an Internet access service. As the use of the collaborative anonymization platform, in order to be able to be established, requires interactions between the access requestor and the providers of access to this platform, it is important that these interactions, while at the same time guaranteeing the privacy of the access requestor, can only be carried out as long as the latter can prove it has effectively been granted the access rights to the collaborative platform.

Solutions based on "roaming" mechanisms, used in the mobile telephony sector, allow a third-party operator to authenticate the client of an original operator without however knowing the long-term secret which is shared between the client and their original operator for the encryption of the exchanges. These mechanisms in which the original operator hands over to the third-party operator elements to be exchanged with their client in order to subsequently authorize them to communicate, allow the user of a service having been granted the rights (in the example of telephony, the rights to a communications service) to benefit from equivalent rights with another service provider, without it being known in which manner it was known by their original operator.

These mechanisms are not satisfactory from the standpoint of the issue being considered, for the main reason that they imply a direct communication in roaming mode and a mutual knowledge between the two operators of the client, i.e. the original network operator with whom the user has taken out their subscription and the third-party network operator with whom they are requesting to be connected. A mutual knowledge between the two operators represents an unacceptable potential breach.

One approach allowing the author of a transaction to be masked, known as "Ring signatures", is described in the article 'How to leak a secret' by Ron Rivest, Adi Shamir, and Yael Tauman, ASIACRYPT 2001, Volume 2248 of Lecture Notes in Computer Science, pages 552-565. The "Ring Signatures" are implemented in particular in the framework of cryptocurrency "CryptoNote", and allow the author of a transaction to be masked amongst a set of candidates. Although, those skilled in the art could derive an application of this principle in the context of the invention where an operator having granted access rights to a platform to a user would camouflage the latter via the use of a ring signature constructed on the basis of their identity and of that of several other candidate clients, this solution could not be generalized because the number of candidates would be relatively limited.

Furthermore, the operator having granted the access rights would be identifiable as the operator of the various candidate clients mentioned in the signature, which would represent an unacceptable potential breach.

There thus exists the need for a solution which is applicable to a large number of clients of one or more service providers and who wish to connect to an anonymization platform. Such a solution must protect the identity of any operator having granted access rights.

Another mechanism close to roaming is the exchange mechanism of the "Push" type described in RFC 2904 which allows a client to access a service by proving to the provider of the latter the existence of a past interaction with an authorization server. Although those skilled in the art could generalize this system with an authorization server which would not hand over the proof of interaction to the user themselves but would store it in a database which could be consulted by the service provider at a later date, such a system would not offer any support for the privacy of the transactions.

Accordingly, there exists the need for a solution which allows a total privacy to be preserved both during the transient phase for connection to a collaborative platform and during the nominal mode of use of the platform.

SUMMARY OF THE INVENTION

The present invention allows the drawbacks of the known approaches to be overcome and the aforementioned needs to be met.

Thus, one subject of the invention is to provide a solution for anonymous access to an anonymization platform.

The general principle of the invention is based on an authorization mechanism which aims to authorize the access to a secure collaborative anonymization platform, in a totally anonymous manner, without a trusted third-party, and/or to authorize the access to a service requiring privacy properties based on such a platform.

Advantageously, the mechanism for access to an anonymization platform is based on a principle of distribution of roles between users and operators in order to obviate the need for a trusted third-party, the trusted third-party being the limitation of the known privacy solutions.

The invention is particularly advantageous for completing the operation in the nominal phase of the collaborative anonymization platform developed by the applicant and described in the aforementioned patent application, by providing a solution for the "transient" phase that allows total privacy to be guaranteed during the phase for connection to the platform while at the same time providing a mechanism for controlling access to the platform.

The invention is advantageously applicable to any anonymous service, chargeable and/or restricted, commercialized and/or offered by one or more operators of a collaborative anonymization platform. These services may be of very varied natures such as: financial databases for guaranteeing the privacy of the users (and for example not revealing the sectors or the companies studied with a view to future investments), artificial intelligence services for "e-health" (where the processing which is carried out remotely at data centers which know the data (typically: X-ray and scanner images, etc.), the healthcare professionals (GP, surgeon), or even individuals directly, put in jeopardy medical data protection).

In order to obtain the desired results, in the independent claim, a method is provided implemented by computer for anonymous control of access to a collaborative anonymization platform operated by various operators, for a user having access rights to the collaborative anonymization platform by a first operator or access provider. The method comprises the steps of:

sending out a request for access to a service of the collaborative anonymization platform, for a user having access rights to said platform granted by a first operator OP1;

receiving a list of data pairs (PEi; Keyi) where each data pair contains an identifier of a point of entry Pei to said platform by an operator from amongst the plurality of operators, and contains a random public key Keyi generated for this point of entry;

generating, in a random manner, a private random value Vx;

selecting 'n' data pairs (Pen, Keyn) where a first data pair (PE1, Key1) has an identifier of a point of entry PE1 to said platform by the first operator OP1, and where each other data pair ((PE2, Key2), . . . , (Pei, Keyi), . . . , (Pen, Keyn)) has an identifier of a point of entry to said platform by another operator;

communicating:
to the first operator via the selected point of entry PE1, a first private key Fx(Vx, Key2, Keyn), constructed, according to a predefined associative and commutative encryption operation 'Fx', from the private random value Vx and from all the public keys associated with the 'n−1' other selected points of entry except for the public key Key1 of the point of entry PE1 of the first data pair (PE1, Key1); and
to each operator of each other selected data pair, a private key Fx(Vx, Key1, . . . , Keyi, . . . , Keyn) constructed, according to the encryption operation 'Fx', from the private random value Vx and from all the public keys associated with the 'n−1' other points of entry except for the public key of said point of entry of each other data pair;

recording, via the collaborative anonymization platform in a database of private keys, a user private key constructed from the first private key Fx(Vx, Key2, . . . , Keyn) and from the public key Key1 associated with the first point of entry;

implementing, on the collaborative anonymization platform, an algorithm for verifying private keys, the algorithm operating in an iterative manner between the first operator and each of the other selected operators in order to verify, in the database of private keys, the validity of the user private key; and validating or refusing access for the user to the collaborative anonymization platform via the point of entry of each operator, depending on the result of the verification.

According to alternative or combined embodiments:
the step of communicating the private keys comprises the steps of:
calculating a first number called "first private user number" (Vx x Key2 x . . . x Keyn) from the private random value Vx and from the public keys associated with the 'n−1' points of entry selected for the other operators; and
calculating, for each other operator, a second number called "second private user number" (Vx x Key1 x . . . x Keyi x . . . x Keyn) from the private random value Vx and from all the public keys associated with the 'n−1' other points of entry except for the public key of said point of entry.

the step of implementing, on the collaborative anonymization platform, an algorithm for verifying and for validating private keys between two operators, comprises the steps of:

(306) for the first operator:
generating, from the first private user number received and from the public key associated with the point of entry of the first operator, a number called "first private user-operator number" ((Vx x Key2 x . . . x Keyi x . . . x Keyn) x Key1), and
recording, via the collaborative anonymization platform, the first private user-operator number ((Vx x Key2 x ... x Keyi x ... x Keyn) x Key1) in a database of private keys (206);

(308) for each of the other operators:

generating, from the second private user number received and from the public key associated with the point of entry of said other operator, a number called "second private user-operator number" ((Vx x Key1 x ... x Keyn) x Keyi); and verifying, via the collaborative anonymization platform, whether the "second private user-operator number" ((Vx x Key1 x ... x Keyn) x Keyi) is recorded in said database of private keys (206).

the step of recording a private user-operator number in the database of private keys further comprises the recording of a lifetime parameter for said number.

the method further comprises, after the recording step, a step of counting down the lifetime parameter.

the step of selection of the data pairs is carried out automatically according to predefined selection criteria.

the encryption operation Fx is an operation of the modular exponentiation type.

the encryption operation Fx is an operation referred to as "one-way accumulators".

The invention covers a computer program product comprising non-volatile code instructions allowing the steps of the method claimed to be carried out, when the program is executed on a computer.

The invention furthermore covers a device for anonymous access control to a collaborative anonymization platform operated by various operators, for a user having access rights to the collaborative anonymization platform by a first operator or access provider, the device comprises means of implementing the steps of the method claimed.

BRIEF DESCRIPTION OF THE DRAWINGS

Other features, details and advantages of the invention will become apparent upon reading the description presented with reference to the appended drawings given by way of example and which show, respectively.

DETAILED DESCRIPTION

Figure 1:
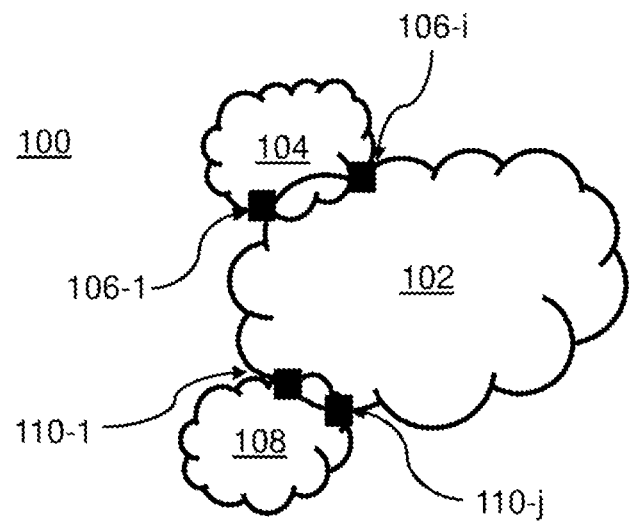
FIG. 1 is a topological representation of an infrastructure allowing the invention to be implemented.
Figure 2:
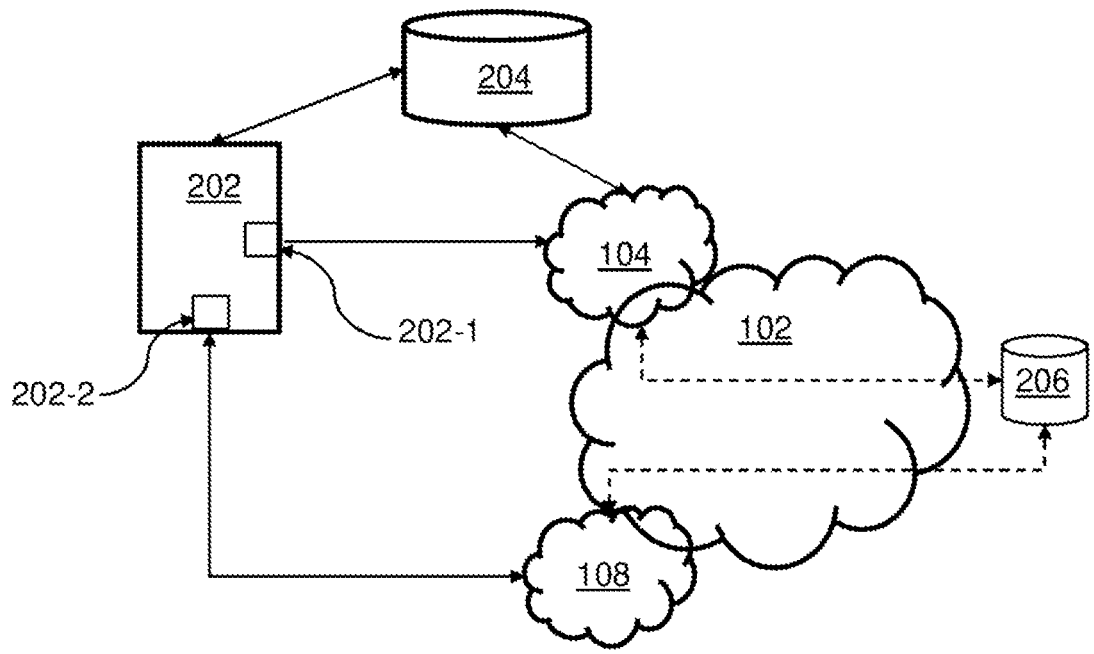
FIG. 2 illustrates a representation of one exemplary embodiment of the invention according to the topology in FIG. 1.

FIG. 1 illustrates a general environment 100 in which the invention is advantageously implemented for example such as illustrated by FIG. 2. The environment comprises a collaborative anonymization platform 102 (also denoted as "anonymous" service) which is operated in a collaborative manner by at least three independent operators, at least two independent operators (104, 108) of which are used for accessing the platform.

In order to obviate the need for a trusted third-party, the platform needs at least three independent operators. In the context of the invention described, a connection to the anonymization service for connecting to the anonymization platform, in an anonymous manner, requires the connection to at least two independent operators (OP1, OP2).

The anonymous service may be a network service or an application service, for which a user/client benefits from a right of access granted by one of the operators of the collaborative anonymization platform. In one embodiment, the operator is the internet service provider (ISP) of the client.

The client device for accessing the anonymous service comprises at least two physical interfaces (202-1, 202-2) each connected to an operator network (104, 108), which includes the ISP of the client.

For reasons of simplicity of description and not of limitation of the invention, although the examples in FIGS. 1 and 2 only show a finite number of operators (104, 108), those skilled in the art may extend the principles described to a plurality of operators, while at the same time applying modifications and/or variants of implementation resulting from the generalization. Thus, the client device may have a single or more than two physical interfaces in order to establish one or more than two connections with a plurality of operators.

In one embodiment of the invention at the 'logic level', in other words when the connection to two operators of the platform is made via a single physical network interface, the anonymous service then relies on an anonymization service at the network level which has the two preceding features (connection to two independent operators and right of access granted). In this latter case, the client may connect in a software (and non-physical) manner to two operators of the anonymization platform.

Coming back to FIG. 1, the network operators each have points of entry Pei onto the platform 102. Each Pei is operated by one of the operators of the collaborative anonymization platform. Thus, for example, the first operator OP1 104, who for the following part of the description is designated as being the historical operator or internet access provider ISP of the client 202 (or else the provider of the anonymous application service), manages points of entry to the platform (106-1 to 106-i), and the second operator OP2 108 manages points of entry to the platform (110-1 to 110-j).

FIG. 2 further illustrates a database or register 204 of public keys (Reg._public_keys) to which the client device gains access during the implementation of the connection method, and a database (AC) of private keys 206 paired to the operators 104, 108 and used as temporary database during the process of anonymous connection.

Each operator point of entry (Pei) to the collaborative anonymization platform randomly generates a public key (Keyi), capable of being updated or otherwise, which is stored in the public database 204. The database thus contains a set of data pairs "point of entry, public key" {(Pei; Keyi)}. This database is directly accessible via the internet access provider or via the collaborative anonymization platform for the embodiment of the invention at the application level.

In one embodiment where the keys are updated, additional attributes well known to those skilled in the art may be added to the data pairs "point of entry, public key", such as for example a lifetime (or "Time-To-Live" (TTL)) indicating the time during which the keys are conserved.

Figure 3:
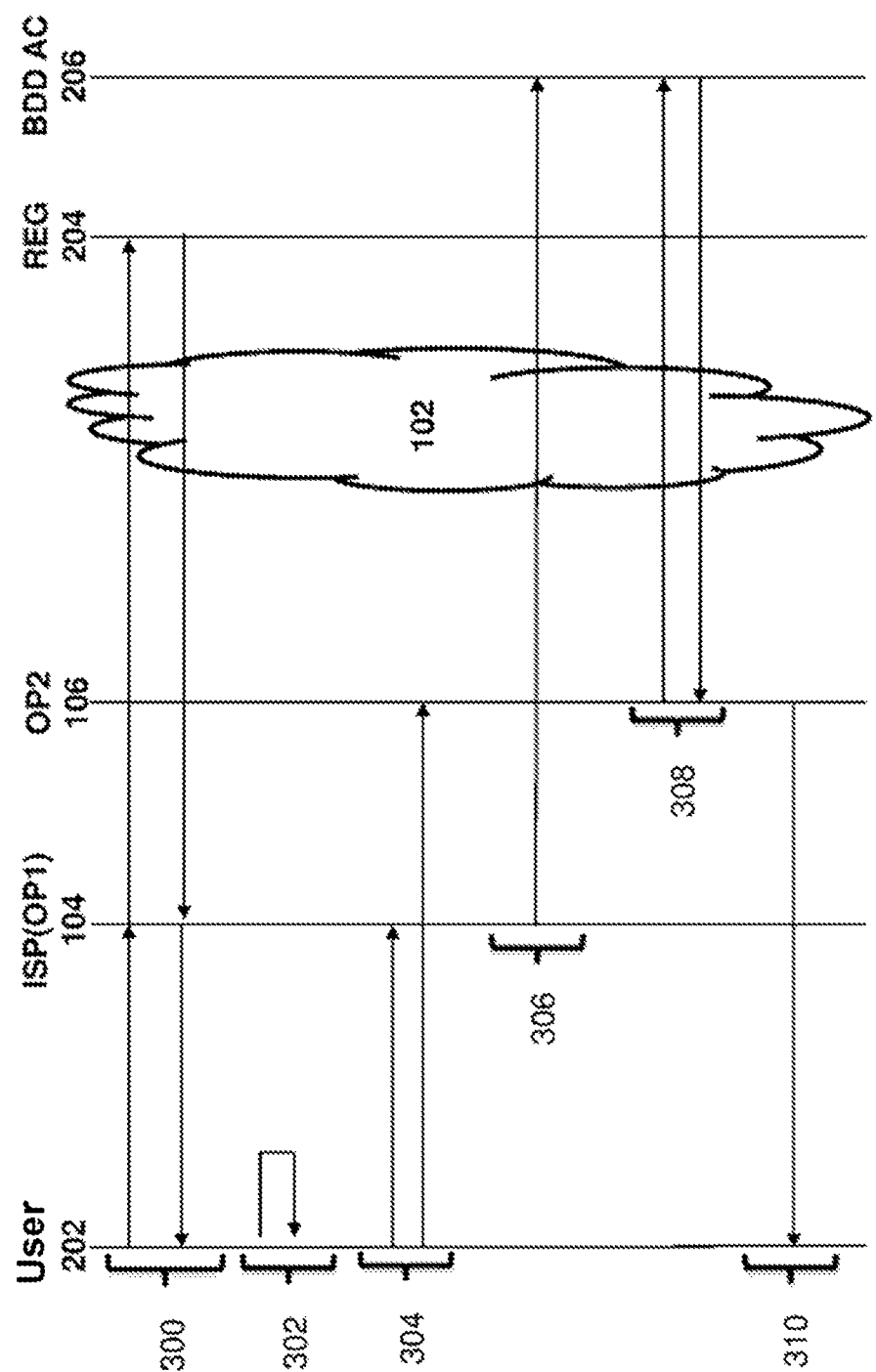
FIG. 3 illustrates the procedures executed between the entities in FIG. 2 in one embodiment of the invention.
Figure 4:
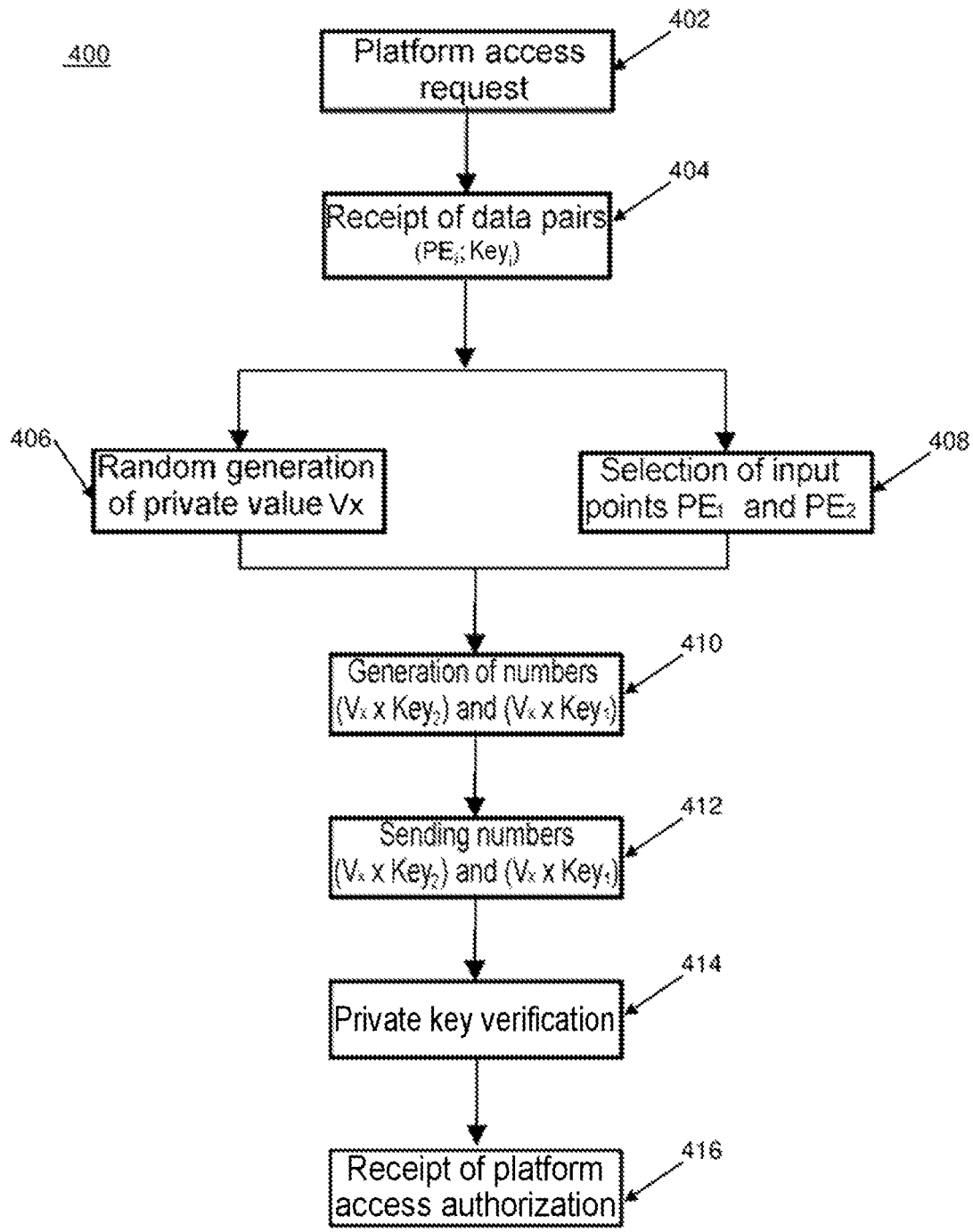
FIG. 4 illustrates the steps operated by the method of the invention in one embodiment.

FIGS. 3 and 4 describe one implementation of the method of the invention according to one embodiment, where FIG. 3 shows the flows existing between the various entities in FIG. 2 and where FIG. 4 illustrates the steps of the method of the invention involving two operators.

It should be noted that the same references are re-used in the various figures for identical elements.

The general principle of anonymous connection of a client 202 to a collaborative anonymization platform 102 consists, for the client, in that they:

- 300: obtain all of the data pairs: point of entry, public keys {(Pei; Keyi)} contained in the public register 204;
- 302: generate, in a random manner, a private random value Vx;
- 304: send, respectively, to each selected operator ISP and OP2, via one of their points of entry, a number called "private user number" (Vx x Key2) and (Vx x Key1), calculated from the private random value Vx and from the public key associated with the point of entry of the other operator; and
- 310: receive from the second operator OP2 an authorization to access the platform 102 (or a rejection).

Furthermore, the method comprises phases carried out for each independent operator, and which consist in that:

- 306: the first operator (ISP) records via the collaborative anonymization platform, in the database of private keys 206, a number called "private user-operator number" ((Vx x Key2) x Key1), generated from the private user number calculated for this operator and from the public key associated with the point of entry of this operator; and
- 308: the second operator OP2 verifies, via the collaborative anonymization platform, whether a "private user-operator number" ((Vx x Key1) x Key2), generated from the private user number calculated for this operator and from the public key associated with the point of entry of this operator, is stored in the database of private keys 206, in order to send back or not an access authorization to the user.

FIG. 4 illustrates the steps of the method 400 for anonymous connection of the invention. The method begins when a user/client, who disposes of access rights to a collaborative anonymization platform via their historical operator (in general, the ISP, their access provider to the internet), wishes to gain access to a service operated on the collaborative anonymization platform by an operator OP2 or by another operator. The user sends a request for access 402 to their operator. The method subsequently allows the client to receive 404 a list of data pairs {(Pei; Keyi)}, where each data pair contains an identifier of a point of entry to the platform by an operator and a public key associated with the point of entry.

In a following step 406, the method allows a private value Vx to be randomly generated, and allows the user to select 408 a first point of entry PE1 operated by their ISP, and a second point of entry PE2 operated by the second operator. In one alternative embodiment, the order of the steps 406 and 408 may be reversed. The selection of the point of entry for each operator may be according to variant embodiments, or discretionary, or automated according to predefined criteria.

In a following step 410, the method allows, for each selected point of entry, a 'private user number' defining a private key to be generated. Each private user number is generated from the private random value Vx and from the public key associated with the other point of entry selected for the other operator. Thus, for the first point of entry PE1 of the historical operator, a first private user number (Vx x Key2) is generated defining a user private key for the first operator, and for the second point of entry PE2 of the second operator, a second private user number (Vx x Key1) is generated defining a second user private key for the second operator.

In one advantageous embodiment, the encryption operation, denoted as "Fx", for the generation of the user private numbers, is a predefined encryption operation such that its inverse operation (i.e. recover 'a' and 'b' starting from 'a Fx b') is extremely difficult to obtain. This operation must also be both associative and commutative.

In one preferential embodiment, the operation "Fx" is a known modular exponentiation function.

In one variant embodiment, the applied 'Fx' operation is known by those skilled in the art as "accumulators", and may be based on "Merkle trees", and "non-Merkle accumulators" which may for example be of the "RSA accumulators" or "Elliptic Curve accumulators" type.

One example of 'Fx' operation based on "accumulators" is described in the article by J. Benaloh and M. de Mare, "One-way accumulators: A decentralized alternative to digital signatures", Advances in Cryptology-Eurocrypt '93, LNCS, vol. 765, Springer-Verlag, 1993, pp. 274-285).

In a following step 412, the method allows the private user number corresponding to them to be communicated to each operator (the ISP and the second operator). Thus, in the example illustrated, the method allows the private user number (Vx x Key2), generated from the public key Key2 associated with the other selected point of entry for the other operator, to be sent to the first operator 104, and the private user number (Vx x Key1), generated from the public key Key1 associated with the point of entry selected for the operator ISP, to be sent to the second operator 106.

The following step 414 consists, on the collaborative anonymization platform, in verifying and validating the private keys. Particularly, the method allows for the first operator ISP to add 306 into the private database (AC), only accessible through the collaborative anonymization platform, a 'private user-operator' number ((Vx x Key2) x Key1) defining a user-first operator private key and generated by the encryption operation Fx from the private user number received from the user—(Vx x Key2)—and from the key—(Key1)—associated with the chosen point of entry for the first operator.

In one variant embodiment, the recording of the 'private user-operator' number in the private database (AC) is associated with the recording of a predefined lifetime parameter. This advantageously allows an automatic de-cluttering of the private database (AC) following for example failed attempts to connect, which allows a continuous and unnecessary growth in the content of the database to be avoided.

The step 414 further consists in that the second operator OP2 interrogates 308 the private database (AC), via the collaborative anonymization platform, in order to verify whether there is a private user-operator number—((Vx x Key1) x Key2)—recorded defining a user-second operator private key and generated by the encryption operation Fx from the private user number received from the user—(Vx x Key1)—and from the key (Key2) associated with the chosen point of entry for the second operator.

If the result of the verification is positive, in a following step 416, the method allows an access authorization to the collaborative anonymization platform to be sent to the user. Indeed, if at the verification step, the second operator receives a confirmation of the existence of the private key in the private database (AC), this information indicates that a past transaction has already taken place between this same user and an operator (i.e. the historical operator), and the second operator can therefore authorize the user to access the collaborative anonymization platform via their network.

Thus, advantageously, the method of the invention allows it to be guaranteed that:
- neither the initial operator having granted the access rights to the platform for the client/user, nor the anonymization service, nor the second operator (or more generally, the other operators) that the client uses for accessing the anonymization platform, are able to "break" the anonymization, in other words none of them is capable, by a network analysis of the requests for connection to the service, of associating with the user of the service, data allowing their identification;
- the operator having granted the access rights to the client/user will not be able to know the other operator or operators used by the client for accessing the anonymization platform;
- the second or all the other operators will not be able to know the initial operator having granted the access rights to the client/user, which is a major difference with the "roaming" mechanisms used for example in mobile telephony;
- the network platform or the anonymization logic will not be able to know which operators are used by the client: nothing else other than the information that a new legitimate connection to the platform has taken place may be deduced.

The example has been described on the basis of two operators, but the method is applicable and generalizable for a plurality of operators, allowing—depending on the properties of the collaborative anonymization platform—the degree of privacy of the user to be reinforced.

Thus, those skilled in the art can derive the generalization according to the following scenario, similar to that described for two operators:
- after having selected 'n' data pairs (Point of entry (PEn); Key (Keyn)) for different operators, from amongst a set of data pairs existing in a public database, the points of entry offering an access to a collaborative anonymization platform by a plurality of operators, and where each operator may have an identical or different number of points of entry, a user sends (i.e. the method allows it to be sent from the client device) to a first point of entry PE1 selected for a first operator (i.e. generally the historical operator of the client ISP), a first private user number—((Vx x Key2 x . . . x Keyn)—constructed from a random value Vx and from the keys associated with the 'n−1' points of entry selected for the other operators;
- the first operator writes into the private database of the device of the invention coupled to the platform, a recording of a private user-operator number—((Vx x Key2 x . . . x Keyn) x Key1)—constructed from the first private user number—((Vx x Key2 x . . . x Keyn)—and from the key—Key1—associated with the first point of entry PE1;
- the user sends to a point of entry PE2 of a second operator, a second private user number—(Vx x Key1 x Key3 x . . . x Keyn)—constructed from the random value Vx and from the keys associated with the 'n−1' points of entry selected for the other operators;
- the second operator OP2 interrogates the private database to find out if a recording exists for a private user-operator number—((Vx x Key1 x Key3 x . . . x Keyn) x Key2)—constructed from the second private user number—(Vx x Key1 x Key3 x . . . x Keyn)—and from the key—Key2—associated with the point of entry PE2 of the second operator;
- the user obtains a validation of access or a refusal of access to the collaborative anonymization platform via the second operator.
- then, iteratively: the user sends for each other point of entry selected up to the $n^{th}$-PEn—a corresponding private user number—(Vx x Key1 x . . . x Keyn−1)—and each respective operator interrogates the private databases in order to verify the existence of a corresponding private user-operator number—((Vx x Key1 x . . . x Keyn−1) x Keyn)—and to grant or to refuse the access to the platform via the corresponding operator.

In another embodiment of the invention, the first operator can write in the private database the recording of the private user-operator number with a lifetime parameter ('Time-To-Live' or TTL) for the number 'n'. A counter allows the parameter TTL to be counted down upon each positive interrogation of the database by another operator, so that when all of the 'n' points of entry have been verified, the TTL is at zero. The private access database can delete the recording.

The invention described may be implemented using hardware and/or software elements. It may be available as a computer program product executed by a processor which comprises code instructions for executing the steps of the method in the various embodiments.

The invention claimed is:
1. A method allowing an anonymous access to a collaborative anonymization platform operated by a plurality of operators, each operator having an identical or different number of points of entry PEi to said platform, the method being implemented by computer and comprising the steps of:
- sending out a request for access to a service of the collaborative anonymization platform, for a user having access rights to said platform granted by a first operator OP1; receiving a list of data pairs (PEi; Keyi) where each data pair contains an identifier of a point of entry PEi to said platform by an operator from amongst the plurality of operators, and contains a random public key Keyi generated for this point of entry;
- generating, in a random manner, a private random value Vx;
- selecting 'n' data pairs (PEn, Keyn), where a first data pair (PE1, Key1) has an identifier of point of entry PE1 to said platform by the first operator OP1, and where each other data pair ((PE2, Key2), . . . , (PEi, Keyi), . . . , (PEn, Keyn)) has an identifier of point of entry to said platform by another operator;
- communicating:
  - to the first operator via the selected point of entry PE1, a first private key Fx(Vx, Key2, . . . , Keyn), constructed, according to a predefined associative and commutative encryption operation 'Fx', from the private random value Vx and from all the public keys associated with the 'n−1' other selected points of entry except for the public key Key1 of the point of entry PE1 of the first data pair (PE1, Key1); and
  - to each operator of each other selected data pair, a private key Fx(Vx, Key1, . . . , Keyi, . . . , Keyn) constructed, according to the encryption operation 'Fx', from the private random value Vx and from all the public keys associated with the 'n−1' other points of entry except for the public key of said point of entry of each other data pair;
- recording, via the collaborative anonymization platform in a database of private keys, a user private key constructed from the first private key Fx(Vx, Key2, . . . , Keyn) and from the public key Key1 associated with the first point of entry;

implementing, on the collaborative anonymization platform, an algorithm for verifying private keys, the algorithm operating in an iterative manner between the first operator and each of the other selected operators in order to verify, in the database of private keys, the validity of the user private key; and validating or refusing access for the user to the collaborative anonymization platform via the point of entry of each operator, depending on the result of the verification.

2. The method as claimed in claim 1, wherein the step of communicating the private keys comprises the steps of:

calculating a first number called "first private user number" (Vx x Key2 x . . . x Keyn) from the private random value Vx and from the public keys associated with the 'n–1' points of entry selected for the other operators; and calculating, for each other operator, a second number called "second private user number" (Vx x Key1 x . . . x Keyi x . . . x Keyn) from the private random value Vx and from all the public keys associated with the 'n–1' other points of entry except for the public key of said point of entry.

3. The method as claimed in claim 1, wherein the step of implementing, on the collaborative anonymization platform, an algorithm for verifying and for validating private keys between the first operator and each of the other operators, comprises the steps of:

for the first operator:

generating, from the first private user number received and from the public key associated with the point of entry of the first operator, a number called "first private user-operator number" ((Vx x Key2 x . . . x Keyi x . . . x Keyn) x Key1); and recording, via the collaborative anonymization platform, the first private user-operator number ((Vx x Key2 x . . . x Keyi x . . . x Keyn) x Key1) in a database of private keys;

for each of the other operators:

generating, from the second private user number received and from the public key associated with the point of entry of said other operator, a number called "second private user-operator number" ((Vx x Key1 x . . . x Keyn) x Keyi); and verifying, via the collaborative anonymization platform, whether the "second private user-operator number" ((Vx x Key1 x . . . x Keyn) x Keyi) is recorded in said database of private keys.

4. The method as claimed in claim 3, wherein the step of recording a private user-operator number in the database of private keys further comprises the recording of a lifetime parameter for said number.

5. The method as claimed in claim 4 further comprising, after the recording step, a step of counting down the lifetime parameter.

6. The method as claimed in claim 1, wherein the step of selection of the 'n' data pairs (PEn, Keyn) is carried out automatically according to predefined selection criteria.

7. The method as claimed in claim 1, wherein the encryption operation Fx is an operation of the modular exponentiation type.

8. The method as claimed in claim 1, wherein the encryption operation Fx is an operation referred to as "one-way accumulators".

9. A non-transitory storage medium on which is stored a computer program, said computer program comprising code instructions allowing the steps of the method as claimed in claim 1 to be carried out, when said program is executed on a computer.

10. A device for anonymous access control to a collaborative anonymization platform operated by various operators, for a user having access rights to the collaborative anonymization platform by a first operator or access provider, the device being configured to implement the method as claimed in claim 1.

* * * * *